United States Patent
Bussinger et al.

(10) Patent No.: US 9,216,120 B2
(45) Date of Patent: Dec. 22, 2015

(54) MANUAL SHOPPING CHAIR

(71) Applicants: Allen Bussinger, Saginaw, MI (US);
Jeffry R. Frahm, Frankenmuth, MI (US)

(72) Inventors: Allen Bussinger, Saginaw, MI (US);
Jeffry R. Frahm, Frankenmuth, MI (US)

(73) Assignee: AMIGO MOBILITY INTERNATIONAL, INC., Bridgeport, MI (US)

( * ) Notice: Subject to any disclaimer, the term of this patent is extended or adjusted under 35 U.S.C. 154(b) by 0 days.

(21) Appl. No.: 13/747,434

(22) Filed: Jan. 22, 2013

(65) Prior Publication Data

US 2014/0203528 A1 Jul. 24, 2014

(51) Int. Cl.
*A61G 5/10* (2006.01)

(52) U.S. Cl.
CPC .................................. *A61G 5/10* (2013.01)

(58) Field of Classification Search
USPC ........... 280/304.1, 33.992, 250.1; 297/174 R; 188/2 F; 224/407
See application file for complete search history.

(56) References Cited

U.S. PATENT DOCUMENTS

| | | | | |
|---|---|---|---|---|
| 3,044,801 A * | 7/1962 | Vicany | ......................... | 280/202 |
| 4,305,601 A * | 12/1981 | Berge | ......................... | 280/304.1 |
| 4,403,786 A * | 9/1983 | Ulics | ......................... | 280/304.1 |
| 4,484,755 A * | 11/1984 | Houston | .................. | 280/33.992 |
| 4,580,803 A * | 4/1986 | Davis | ......................... | 280/304.1 |
| 4,795,182 A * | 1/1989 | Dyess et al. | ............... | 280/304.1 |
| 5,799,756 A * | 9/1998 | Roberts et al. | ................. | 188/2 F |
| 5,984,334 A * | 11/1999 | Dugas | ......................... | 280/250.1 |
| 6,352,138 B1 * | 3/2002 | Duran et al. | ................... | 188/2 F |
| 6,464,238 B2 * | 10/2002 | Reiland et al. | ........... | 280/33.993 |

* cited by examiner

*Primary Examiner* — J. Allen Shriver, II
*Assistant Examiner* — Brian Cassidy
(74) *Attorney, Agent, or Firm* — Robert L. Farris; Farris Law, P.C.

(57) ABSTRACT

The manual shopping chair includes a frame supported by a left rear wheel, a right rear wheel, a left front caster wheel and a right front caster wheel. A wheel lock disk with a plurality of radially extending slots is connected to each rear wheel. Springs urge lock bars toward the slots to lock both wheels. The lock bars are manually held out of the slots during movement. A mast is clamped to the frame front. A pair of basket support tubes are pivotally attached to the mast by a shaft in vertical slots. A basket is clamped to basket tubes. The basket is pivotable from a storage position to an upright position. Hooks hold the support tubes in an upright position. The mast top edge is lower than a seat mounted on the frame for nesting multiple shopping units.

6 Claims, 10 Drawing Sheets

MANUAL SHOPPING CHAIR

CROSS REFERENCE TO RELATED APPLICATION

This application claims the benefit of the filing date of U.S. Provisional Application No. 61/589,866, titled MANUAL SHOPPING CHAIR Filed Jan. 23, 2012.

TECHNICAL FIELD

The shopping chair is manually propelled, carries a shopper passenger, nests with other shopping chairs and has rear wheel locks that lock both rear wheels when the locks are not held in a released position by a person that propels the chair.

BACKGROUND OF THE INVENTION

Large warehouse stores are found near small cities and large towns through North America. Other parts of the world also have large warehouse stores. These stores have large parking lots adjacent to their entry and exit doors. Most shoppers travel substantial distances to the stores. Shoppers arrive at the stores in private vehicles. Shoppers may also arrive by public transportation if public transport is available The large ware house stores have flat floors and wide aisles between merchandise that is for sale. Shopping carts suitable for holding the merchandise a shopper wishes to purchase are provided. Motor driven carts are often provided for people who are not physically able or do not desire to walk and push a shopping cart.

The large warehouse stores are able to provide relatively low prices due to high volume sales. The large warehouse stores are also able to provide the convenience of motor driven carts.

The large warehouse stores are generally far apart. Such stores are not located in small towns or the center of cities. Many people must drive substantial distances to shop in a large warehouse store.

Shopping carts are required to be relatively large to perform their function. The shopping carts employed by many stores nest together when not in use to reduce storage space. Adding a seat for a grown person to ride makes nesting difficult. The carts with a seat for an adult and baskets provide limited reduction in the total length of two nested carts.

Stores in rural areas, small towns and the center of cities have limited space for shopping carts, narrow aisles, and cannot provide motor driven carts with a seat for a shopper. Due to a lower volume of sales, it is difficult for small stores to sell goods for less than similar goods sold by large warehouse stores.

There is a need to provide a shopping cart that transports physically challenged individuals and seniors that are moved manually by an adult, and that can be nested with each other to minimize space requirements. Shopping carts that have the above features will permit individuals, that are physically challenged or seniors, shop in small towns or inner cities near their homes without traveling substantial distances to large warehouse stores. Shopping near their homes will permit more frequent shopping thereby reducing the need for storage space. More frequent shopping may also decrease the quantity of products that are stored after an expiration date.

SUMMARY OF THE INVENTION

The manual shopping chair has a frame assembly that includes a one piece tubular frame member. The one piece tubular frame member includes a left bar, a left transition bar portion extending forward and to the right from the left bar and a left forward bar portion extending upward and forward from the left transition bar portion. The one piece tubular frame member also includes a right bar that is parallel to and spaced from the left bar. A right transition bar portion extends forward and to the left from the right bar. A right forward bar portion extends upward and forward from the right transition bar portion. The right forward bar portion is parallel to the left forward bar portion. A front horizontal transverse bar extends from the left forward bar portion to the right forward bar portion, to connect the left side to the right side.

The frame assembly also includes an angle member welded to the one piece tubular frame member. The angle member extends from the left forward bar portion to the right forward bar portion. The angle member has a vertical surface extending downward from the horizontal transverse bar and from the left forward bar portion to the right forward bar portion of the one piece tubular frame member. A horizontal surface, of the angle member, extends from the vertical surface toward the rear.

An upside down U-shaped pipe, of the frame assembly includes a left vertical pipe portion with a lower end fixed to the left bar. A right vertical pipe portion has a lower end fixed to the right bar. A horizontal pipe portion is integral with the left vertical pipe portion and the right vertical pipe portion.

The frame assembly also includes a left handle bar lower pipe with a left handle bar pipe bottom end fixed to the left bar. A right handle bar lower pipe has a right handle bar pipe bottom end fixed to the right bar. A transverse horizontal seat support pipe is fixed to the left handle bar lower pipe and to the right handle bar lower pipe. A seat mounting plate is fixed to the transverse horizontal seat support pipe and to the horizontal pipe portion of the upside down U-shaped pipe of the frame assembly.

A left wheel support tube has an upper front end fixed to the left handle bar lower pipe. A lower rear end of the left wheel support tube is fixed to the left bar of the one piece tubular frame member. A right wheel support tube has an upper front end fixed to the right handle bar lower pipe. A lower rear end of the right wheel support tube is fixed to the right bar of the one piece tubular frame member.

The frame assembly includes a left wheel lock plate fixed to the left vertical pipe portion of the upside down U-shaped pipe, the left handle bar lower pipe and the left wheel support tube. The frame assembly also includes a right wheel lock plate fixed to the right vertical pipe portion of the upside down U-shaped pipe, the right handle bar lower pipe, and the right wheel support tube.

The frame assembly includes a foot support plate with a foot support surface extending upwardly and forwardly from a rear flange, fixed to the left forward bar portion and the right forward bar portion, to the front horizontal transverse bar of the one piece tubular frame member.

A left rear wheel includes a tire mounted on a left wheel hub that is journaled on a left wheel spindle that is fixed in a left wheel support tube. A left wheel lock disk, with a cylindrical outer surface and a plurality of radially extending slots each of which has a center line that is a radius of the wheel lock disk. The left wheel lock disk is fixed to the left wheel hub. A right rear wheel is journaled on a right wheel spindle. The right wheel spindle is fixed in the right wheel support tube and coaxial with the left wheel spindle. A right wheel lock disk, that is identical to the left wheel lock disk. The right wheel lock disk is fixed to the right rear wheel hub. The right wheel lock disk has a plurality of radially extending slots.

A left lock arm is pivotally attached to the left wheel lock plate by a left pivot pin. The left lock arm includes an integral lock bar that is movable into and out of one of the plurality of radially extending slots in response to pivotal movement of the left lock arm relative to the left wheel lock plate.

A right lock arm is pivotally attached to the right wheel lock plate by a right pivot pin. The right lock arm includes an integral lock bar. The right integral lock bar is movable into and out of one of the plurality of radial extending slots in the right wheel lock disk in response to a pivotal movement of the right lock arm relative to the right wheel lock plate.

A left upper tube, a horizontal transverse handle integral with the left upper tube, a right upper tube integral with the horizontal transverse handle and parallel to the left upper tube have the left upper tube attached to the left handle bar lower pipe and the right upper tube attached to the right hand bar lower pipe to form a handle bar assembly. A lock release rod is slidably attached to the left upper tube and slidably attached to the right upper tube. A left end of the lock release rod is attached to the left lock arm. A right end of the lock release rod is attached to the right lock arm. A left compression spring urges the lock release rod downward thereby urging the integral lock bar of the left lock arm toward the left wheel lock disk and into one of the plurality of radially extending slots in the left wheel lock disk. A right compression spring urges the lock release rod downward thereby urging the integral lock bar of the right lock arm toward the right wheel lock disk and into one of the plurality of radially extending slots in the right wheel lock disk. Lifting the lock release rod relative to the horizontal transverse handle pivots the left lock arm and moves the integral lock bar from engagement with the wheel lock disk. Lifting the lock release rod also frees the left rear wheel to rotate, lifting the lock release rod also pivots the right lock arm and moves the integral right lock bar from engagement with the right wheel lock disk and frees the right rear wheel to rotate.

A left caster wheel and a right caster wheel are spaced apart and mounted on the angle member of the frame assembly and support the front horizontal transverse bar.

A front mast assembly in combination with a basket assembly includes a basket support bar clamped to the vertical surface of the angle member of the frame assembly. A left tube is welded to the basket support bar and includes a vertical upward extending end. A right tube is welded to the support bar and includes a vertical upward extending end. A vertical transverse plate is fixed to the left tube and to the right tube. A first outboard vertical plate is fixed to the left tube and the vertical transverse plate. A second outboard vertical plate is fixed to the right tube and the vertical transverse plate. Both outboard vertical plates extend rearward from the vertical transverse plate. A first inboard vertical plate is fixed to the left tube and the vertical transverse plate. A second inboard vertical plate is fixed to the right tube and the vertical transverse plate. Aligned vertical slots are provided through the first and second outboard vertical plates and the first and second inboard vertical plates. The vertical slots are in horizontal alignment with each other.

The basket assembly includes a left basket support tube. The left basket support tube has a pivoted tube portion and an integral basket engaging tube portion. A right basket support tube includes a pivoted tube portion and an integral basket engaging tube portion. A free end of the pivoted tube portion of the left basket support tube is received between the first outboard vertical plate and the first inboard vertical plate. A free end of the pivoted tube portion of the right basket support tube is received between the second outboard vertical plate and the second inboard vertical plate.

At least one shaft passes through the vertical slots through the first outboard vertical plate, through the free end of the pivoted tube portion of the left basket support tube, and through the vertical slot through the first inboard vertical plate. The at least one shaft also passes through the vertical slot through the second inboard vertical plate, through the free end of the pivoted tube portion of the right basket support tube and through the vertical slot through the second outboard vertical plate.

A basket assembly is attached to the basket engaging tube portion of the left basket support tube and the basket engaging tube portion of the right basket support tube.

A left hook on the left basket support tube and a right hook on the right basket support tube engage the vertical transverse plate when the at least one shaft is positioned in a lower portion of the vertical slots. The left hook and the right hook hold the basket in an upright position when both hooks engage the vertical transverse plate. When the at least one shaft is positioned in an upper portion of the vertical slots, the front basket assembly is free to pivot about the at least one shaft between the upright position and a lower storage position.

The front basket mast assembly has a mast top edge that is below the seat mounting plate, the horizontal pipe portion of the U-shaped pipe and the transverse horizontal seat support pipe mounted on the left handle bar lower pipe and the right handle bar lower pipe.

A seat is attached to the seat mounting plate. A left arm rest is pivotally attached to a left arm rest mount. The left arm rest mount is secured to a left upper tube of the handle bar assembly. A right arm rest is pivotally attached to a right arm rest mount. The right arm rest mount is secured to a right upper tube of the handle bar assembly.

BRIEF DESCRIPTION OF DRAWINGS

The presently preferred embodiment of the invention is disclosed in the following description and in the following drawings, wherein.

DETAILED DESCRIPTION OF THE PREFERRED EMBODIMENTS

Figure 1:
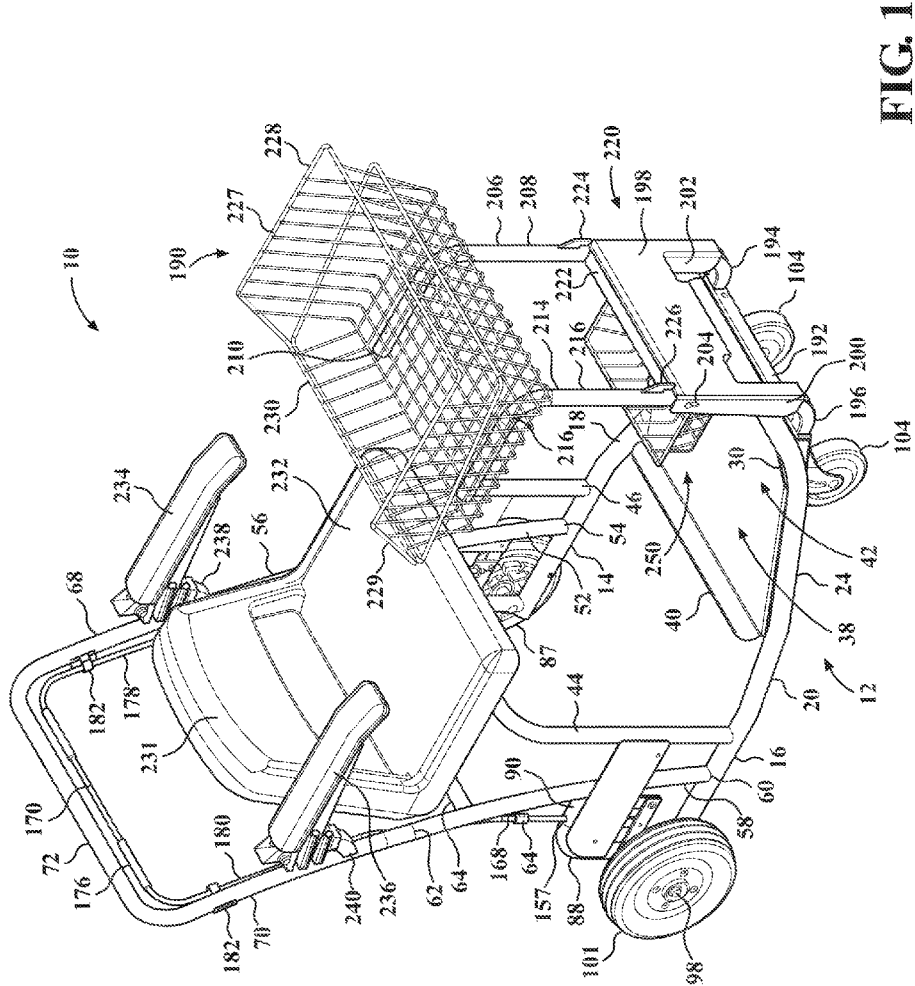
FIG. 1 is a perspective view of the manual shopping chair with a front upper basket and a front lower basket.

The manual shopping chair 10 has a frame assembly 12. The frame assembly 12 includes a left bar 14 and a right bar 16. The left bar 14 and the right bar 16 are spaced apart, parallel to each other, and generally horizontal. A left transition bar portion 18 extends forwardly and to the right from the left bar 14. A right transition bar portion 20 extends forwardly and to the left from the right bar 16. A left forward bar portion 22 extends forwardly and upwardly from the left transition bar portion 18. A right forward bar portion 24 extends forwardly and upwardly from the right transition bar portion 20. The left forward bar portion 22 and the right forward bar portion 24 are parallel to each other and spaced apart a distance that is less than the distance between the left bar 14 and the right bar 16. A front horizontal transverse bar 26 is connected to the left forward bar portion 22 by a left ninety degree bend 28. The front horizontal transverse bar 26 is also connected to the right forward bar portion 24 by a right ninety degree bend 30.

The bars 14, 16, 18, 20, 22, 24, front horizontal transverse bar 26, left ninety degree bend 28 and right ninety degree elbow 30 may be connected together by suitable connectors to form a frame assembly 12. However, the frame assembly 12 is preferably formed by bending one tubular pipe, with a circular cross section, to form the horizontal transverse bar 26, the ninety degree bends 28 and 30, the left forward bar portion 22, the right forward bar portion 24, the left transition bar portion 18, the right transition bar portion 20, the left bar 14 and the right bar 16. The tubular pipe that forms the frame assembly 12 is preferably made from steel or other light weight material.

An angle member 32 with a vertical surface 34 and a horizontal surface 36 extends from the left forward bar portion 22 to the right forward bar portion 24 and from the front horizontal transverse bar 26 downward. The angle member 32 is fixed to the frame assembly 12 by welding or other fixing procedure.

A foot support plate 38 is attached to the frame assembly 12. The foot support plate 38 extends from the left forward bar portion 22 to the right forward bar portion 24. The foot support plate 38 also extends rearward and downward from the front horizontal transverse bar 26 toward the left transition bar portion 18 and the right transition bar portion 20. A flange 40 on a rear edge of foot support plate 38 extends upwardly from the foot support surface 42. The foot support surface 42 is a non-slip surface. The flange 40 limits rearward movement of a shopper's feet from the foot support surface 42. The foot support plate 38 may be attached to the frame assembly 12 by mechanical fasteners or it may be welded in place. The foot support plate 38, the left forward bar portion 22 and the right forward bar portion 24 and the foot support plate 38 extend upward and formed at an angle of up to twenty degrees relative to the generally horizontal left bar 14 and right bar 16. A horizontal transverse tube 39 is fixed to the left forward bar portion 22 and the right forward bar portion 24 adjacent to the left transition bar portion 18 and the right transition bar portion 20. The foot support plate 38 is also fixed to the transverse tube 39.

An upside down U-shaped pipe 44 includes a left vertical pipe portion 46, a right vertical pipe portion 48 and a horizontal pipe portion 50. The horizontal pipe portion 50 is integral with upper the ends of left vertical pipe portion 46 and the right vertical pipe portion 48. A lower end of the left vertical pipe portion 46 is fixed to left bar 14. A lower end of the right vertical pipe portion is fixed to the right bar 16. The U-shaped pipe 44 including the left vertical 48 pipe portion, the right vertical pipe portion 48 and the horizontal pipe portion 50 is preferably formed from a single pipe with two bends of ninety degrees.

A handle bar assembly includes a left handle bar lower pipe 52 with a left handle pipe bottom end 54 fixed to the left bar 14 of the frame assembly 12. The left handle bar lower pipe 52 extends upwards and rearward to a left handle bar lower pipe top end 56. A right handle bar lower pipe 58 includes a right handle pipe bottom end 60 fixed to the right bar 16 of the frame assembly 12. The right handle bar lower pipe 58 extends upward and rearward to a right handle bar lower pipe top end 62. A transverse horizontal seat support pipe 64 is fixed to left handle bar lower pipe 52 below the left handle bar lower pipe top end 56. The transverse horizontal seat support pipe 64 is also fixed to the right handle bar lower pipe 58 below the right handle lower pipe top bar end 62. A seat mounting plate 66 has a plate forward portion that is fixed to the horizontal pipe portion 50 of U-shaped pipe 44 and a plate rear portion that is fixed to the transverse horizontal seat support pipe 64.

An upper portion of the handle bar assembly includes a left upper tube 68 that is attached to left handle bar lower pipe top end 56 of the left handle bar lower pipe 52. The upper portion of the handle bar assembly also includes a right upper tube 70 that is attached to the right handle bar lower pipe top end 62. A horizontal transverse handle 72 is integral with upper ends of the left upper tube 68 and the right upper tube 70. The left upper tube 68, the horizontal transverse handle 72 and the right upper tube 70 may be formed from a straight tube by making two ninety degree bends in the straight tube.

The connections between the left handle bar lower pipe 52 and the left upper tube 68 as well as the connections between the right upper tube 70 and the right handle bar lower pipe 58 can be made by a left connector pipe and a right connector pipe (not shown). The left connector pipe may be telescopically received in adjacent ends of left upper tube 68 and the left handle bar lower pipe 52 and secured in place by mechanical fasteners. The right connector pipe may be telescopically received in adjacent ends of the right upper tube 70 and the right handle bar lower pipe 58 and secured in place by mechanical fasteners. The mechanical fasteners permit separation of the upper portion of the handle bar assembly. Separation of the left upper tube 68, the right upper tube 70 substantially reduces the vertical height of the manual shopping cart 10.

The left handle bar lower pipe 52, left upper tube 68, the horizontal transverse handle 70, the right upper tube 70, and the right handle bar lower pipe 58 may be formed from one elongated straight tube if desired. A one piece handle bar may decrease manufacturing costs. However, shipping costs would most likely increase if several manual shopping carts 10 were shipped together.

A left wheel support tube 74 has an upper front end 76 fixed to the left handle bar lower pipe 52. A lower rear end 78 of the left wheel support tube 74 is fixed to the left bar 14 of the frame assembly 12. The left wheel support tube 74 includes a curved tube portion 80 that extends up to ninety degrees about an axis. A vertical tube portion 82 extends upward from the left bar 14, of the frame assembly 12, to the curved tube portion 80. A left wheel spindle 84 passes through a horizontal bore 86 is spaced a selected distance above the left bar 14 to provide a stable shopping chair and also provide adequate ground clearance between the frame assembly 12 and any expected ground or floor obstacles.

A right wheel support tube 88 has an upper front end 90 fixed to the right handle bar lower pipe 58. A lower rear end 92 of the right wheel support tube 88 is fixed to the right bar 16 of the frame assembly 12. The right wheel support tube 88 includes a curved tube portion 94 that extends up to ninety degrees about an axis. A vertical tube portion 96 extends upward from the right bar 16 of the frame assembly 12 to the curved tube portion 94. A right wheel spindle 98 passes through a horizontal bore through the vertical tube portion 96 that is coaxial with horizontal bore 86 through the left wheel support tube 74. A right rear wheel 101 is journaled on the right wheel spindle 98. The horizontal bore through the vertical tube portion is spaced a selected distance above the right bar 16 to provide a stable shopping chair 10 and also provide adequate ground clearance between the frame assembly 12 and any expected ground or floor obstacles.

A left caster wheel 102 is pivotally attached to a generally horizontal surface 36 of the angle member 32 for pivotal movement about a generally vertical axis. The left caster wheel 102 is to the rear of the front horizontal transverse bar 26, of the frame 12, and inboard of the left forward bar portion 22. A right caster wheel 104 is pivotally attached to the generally horizontal surface 36 of the angle member 32 for pivotal movement about a generally vertical axis. The right caster wheel 104 is to the rear of the front horizontal transverse bar 26, of the frame 12, and inboard of the right forward bar portion 24.

A left rear wheel 87 and the right rear wheel 101 both have a wheel hub 106. The wheel hubs 106 have outboard bearing 108 received in outboard counter bores 110. The wheel hubs 106 also have inboard bearings 112 mounted in inboard counter bores 114. A wheel lock disk 116 is an integral part of each wheel hub 106. The wheel hub 106 and the lock disk 116 are preferably injection molded plastic material. The wheel disk 116 has a cylindrical surface 118. A plurality of radially extending slots 120 pass through the cylindrical outer surface 118 toward the center of the wheel lock disk 116. Each of the radially extend slots 120 has a slot center line 122 that is a radius of the wheel hub 106. Each radially extending slot 120 includes a narrow radially inner slot portion 124 and wider radially outer slot portion 126. The walls 128 and 130 of the radially inner slot 124 are both parallel to the slot center line 122 and spaced equal distances from the slot center line. The walls 132 and 134 of the wider radially outer slot 126 are both parallel to the slot center line 122 and spaced equal distances from the slot centerline. A tire 136 is mounted on each wheel hub 106. The tire is preferably a urethane or rubber like material A left wheel lock plate 138 is fixed to an outboard side of the left vertical pipe portion 46, the left handle bar lower pipe 52 and the left wheel support tube 74. A right wheel lock plate 140 is fixed to an outboard side of the right vertical pipe portion 48, the right handle bar lower pipe 58 and the right wheel support tube 88. Each of the wheel lock plates 138 and 140 includes an integral plate member 142. A lock arm 144 forward end 146 pivotally attached to the integral plate member 142 by a pivot pin 148. A lock bar 150 is integral with a rear end 152 of the lock arm 144. A tension rod 154 passes through a vertical bore 157 through the adjacent left wheel support tube 74 or right wheel support tube 88. A free end of the tension rod 154 is adjustably attached to a bracket 156 by an upper nut 158 and a lower nut 160. The bracket 156 is attached to the lock arm 144 between the forward end 146 and the lock bar 160. A compression spring 162, mounted on tension rod 154 acts on the adjacent wheel support tube 74 or 88 and on the upper nut 158 to pivot the lock arm 144 about the pivot pin 148 and move the lock bar 150 toward the wheel lock disk 116.

Figure 7:
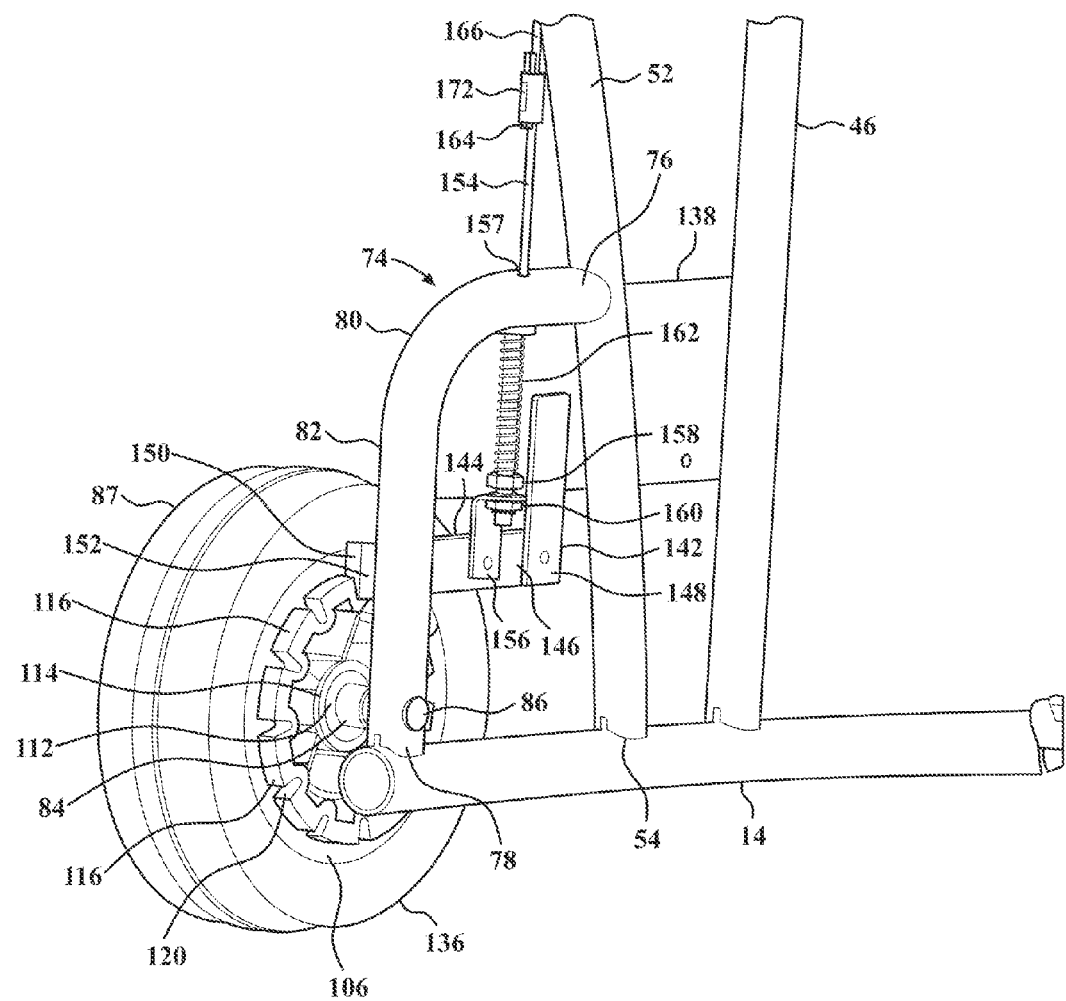
FIG. 7 is an enlarged perspective view of the left rear wheel and wheel brake attached to the manual shopping cart frame with parts broken away.

The upper ends 164 of the two tension rods 154 are connected to an adjacent left end 166 or right end 168 of a lock release rod 170 by a left rod connector 172 or a right rod connector 174. The lock release rod 170 includes a horizontal release handle portion 176 that is below the horizontal transverse handle 72. A left generally vertical rod portion 178 is integral with the horizontal release handle portion 176 and extends downward and forward to the right rod connector 174. Guides 182 are attached to the left upper tube 68 and the right upper tube 70 of the handle bar assembly. These guides 182 slidably support and guide the lock release rod 170. The horizontal release handle portion 176 is manually moved toward the horizontal transverse handle 72 to move the lock bars 150 from radially extending slots 120 and free the left rear wheel 87 and the right rear wheel 101 to rotate. Releasing the horizontal release handle portion 176 of the lock release rod 170 permits the compression springs 162 to expand and move the lock bars 150 into engagement with wheel lock disks 116. The springs 162 force the lock bars 150 into the radially extending slots 120 when the lock bars are in alignment with the radially extending slots. The slots 120, as shown in FIG. 7 are spaced thirty degrees apart. Both rear wheels 87 and 101 are locked upon rotating less than thirty degrees about the wheel spindles 84 and 98 in either direction A front basket assembly 190 includes a basket support bar 192 that is clamped to the vertical surface 34, of the angle member 32, by bolts. A left tube 194 with a ninety degree bend, a vertical upward extending end and a rectangular cross section, is welded to the basket support bar 192. A right tube 196 with a ninety degree bend, a vertical upward extending end and a rectangular cross section, is welded to the basket support bar 192. A vertical transverse plate 198 is fixed to the left tube 94 and the right tube 196 and extends upward from the left tube and the right tube. A first outboard vertical plate 200 is fixed to the left tube 194 and the vertical transverse plate 198 and extends rearward from the vertical transverse plate. A second outboard vertical plate 200 is fixed to the right tube 196 and the vertical transverse plate 198 and extends rearward from the vertical transverse plate. The first and second outboard vertical plates 200 are identical. A first inboard vertical plate 202 is fixed to the left tube 194 and the vertical transverse plate 198 extends the vertical height of the vertical transverse plate, and is parallel to the first outboard vertical plate. A second inboard vertical plate 202 is fixed to the right tube 196 and the vertical transverse plate 198, extends the vertical height of the vertical transverse plate and is parallel to the second outboard vertical plate 200. Horizontal aligned vertical slots 204 are provided through the outboard vertical plates 200 and the inboard vertical plates 202. A left basket support tube 206 has pivoted tube portion 208 and an integral basket engaging tube portion 210. A right basket support tube 212 has a pivoted tube portion 214 and an integral basket engaging tube portion 216. The free end of the pivoted tube portion 208 is received between the outboard vertical plate 200 and the inboard vertical plate 202 that receives the left tube 194. The free end of the pivoted tube portion 214 is received between the outboard vertical plate 200 and the inboard vertical plate 202 that receives the right tube 196. A shaft 218 passes through vertical slots 204 and bores through the pivoted tube portions 208 and 214 to pivotally attach the left basket support tube 206 and right basket support tube 212 to a front basket mast assembly 220. The shaft 218 may be single shaft member or two separate shafts. A transverse tube 222 may be fixed to the pivoted tube portion 208 and the pivoted tube portion 214 to make the front basket assembly 190 more rigid. When the shaft 218 is lifted to the top of the vertical slots 204, the left basket support tube 206 and the right basket support tube 212 can be pivoted about the shaft. A hook 224 and a hook 226, are fixed to the pivot tube portion 208 and the pivot tube portion 214 respective. The hooks 224 and 226 engage the vertical transverse plate 198 when pivot tube portion 208 and the pivot tube portion 214 are vertical and the shaft 218 is moved to the bottom of vertical slots 204.

A basket 228 made from steel rods is mounted on the basket engaging tube portion 210 and basket engaging tube portion 216. Clamps (not shown) secure the basket 228 to the left basket support tube 206 and the right basket support tube 212. The rear wall top edge 230 of the basket is lowered relative to the side wall tops 227 and 229.

Figure 2:
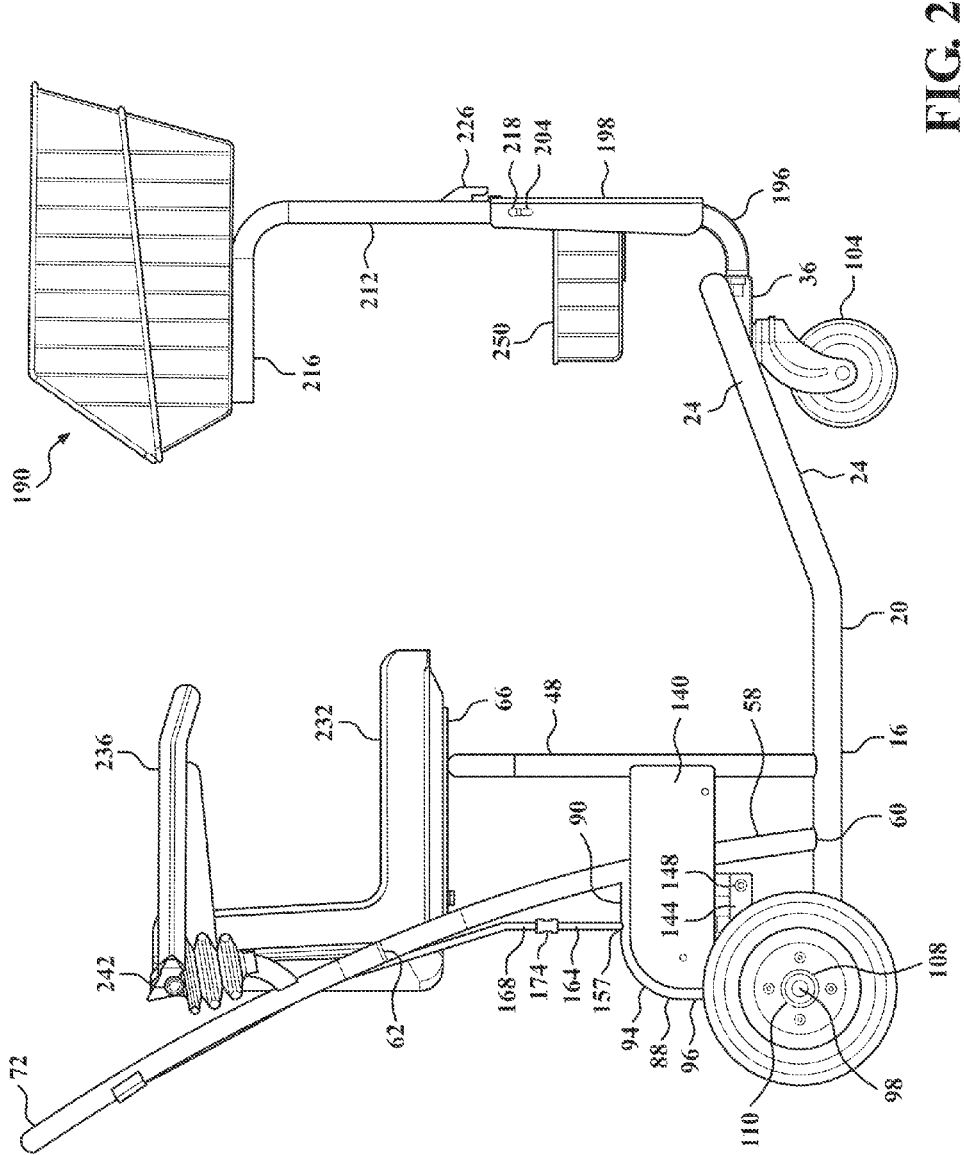
FIG. 2 is a right side elevational view of the manual shopping cart shown in FIG. 1.
Figure 3:
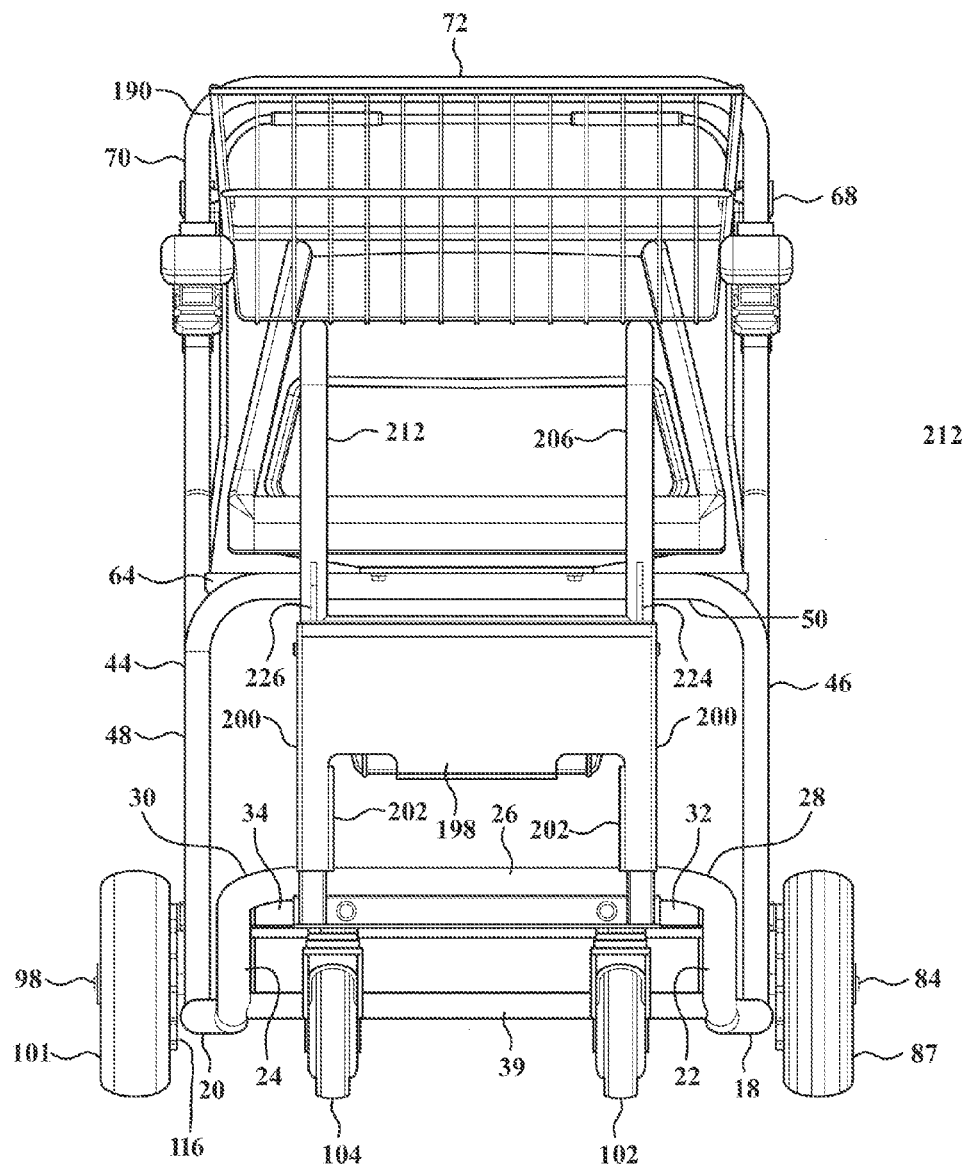
FIG. 3 is a front elevational view of the manual shopping cart shown in FIG. 1.
Figure 4:
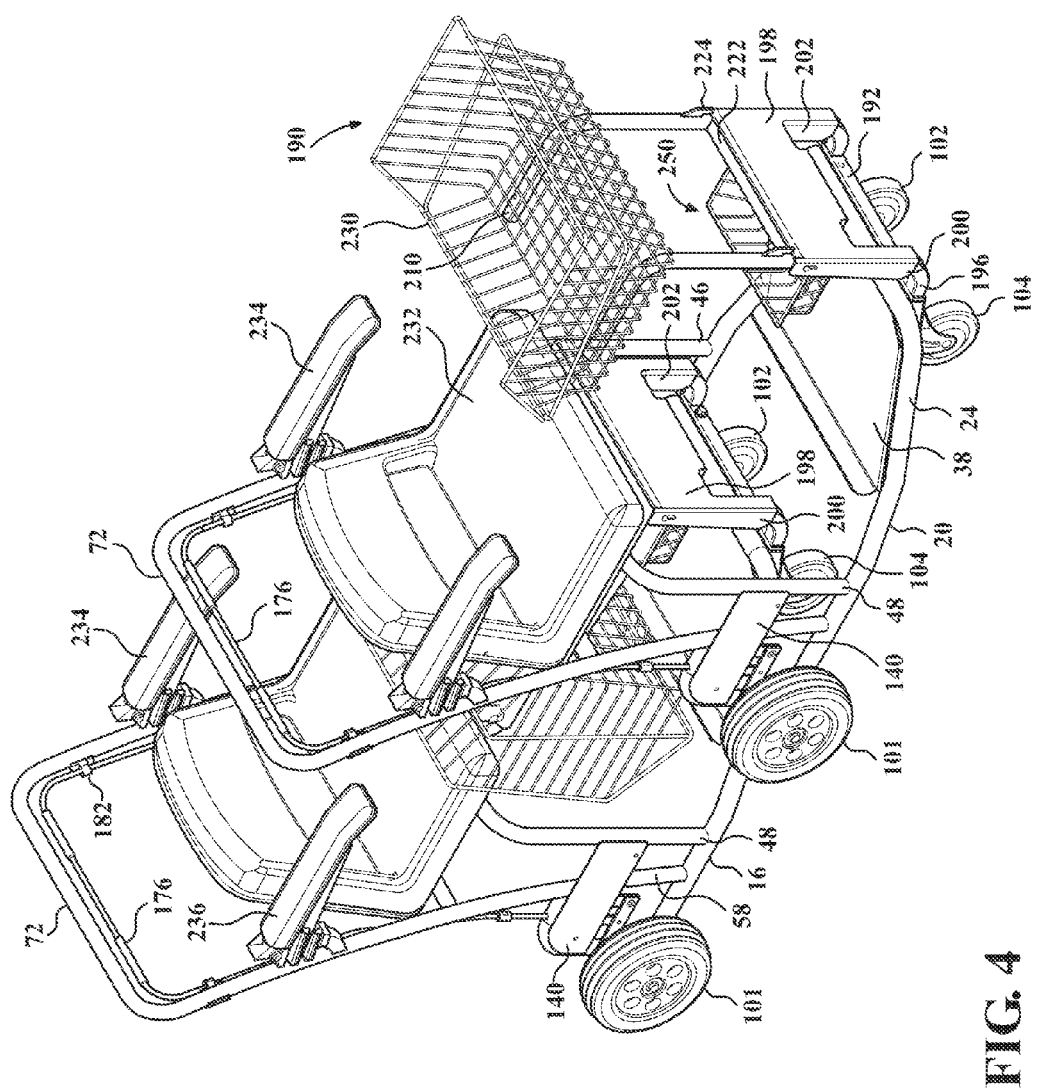
FIG. 4 is a perspective view of a manual shopping cart shown in FIG. 1 nested with a second manual shopping cart.

A seat 232 is fastened to a seat mounting plate 66. The seat 232 as shown has an integral back rest 231 arm rests 234 and 236 are secured to the left upper tube 68 and the right upper tube 70 by arm rest mounts 238 and 240. Each arm rest 234 and 236 can be pivoted about a shaft 242 of each arm rest mount 238 and 240 between a horizontal use position shown in FIG. 2 and a position generally parallel to the left upper tube 68 or the right upper tube 70. The arm rests 234 and 236 are pivoted up and to the rear to facilitate movement of a person onto or from the seat 232. The arm rests 234 and 236 are shown in positions parallel to the respective adjacent tubes 68 and 70 in FIG. 8.

Figure 5:
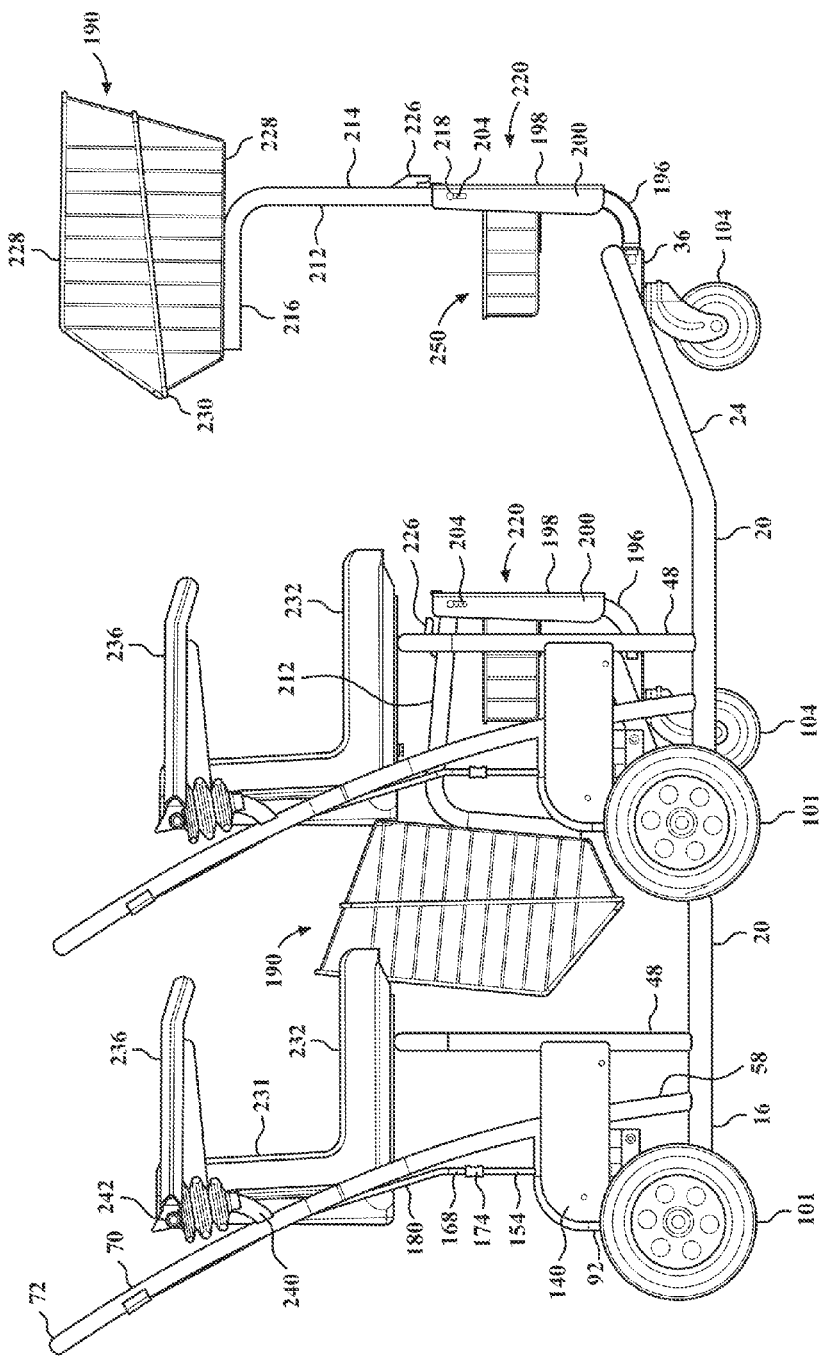
FIG. 5 is a side elevational view of two manual shopping carts, as shown in FIG. 4, nested together.

The front basket assembly 190 is pivoted to a storage position, shown in FIG. 5, to facilitate nesting. The rear wall top edge 230 clears the front edge of the seat 232. With front basket assembly 190 in a storage position, as shown in FIG. 5, the front caster wheels 102 and 104, the front horizontal transverse bar 26 of the frame assembly 12 and the basket support tubes 206 and 212 of one manual shopping chair 10 can move between the left bar 14 and the right bar 16 and under the seat 232 of a second manual shopping chair. Moving the front caster wheels 102 and 104, to the rear of the front horizontal transverse bar 26, and toward the left rear wheel 87 and the right rear wheel 101 improves maneuverability of the shopping chair 10.

Figure 6:
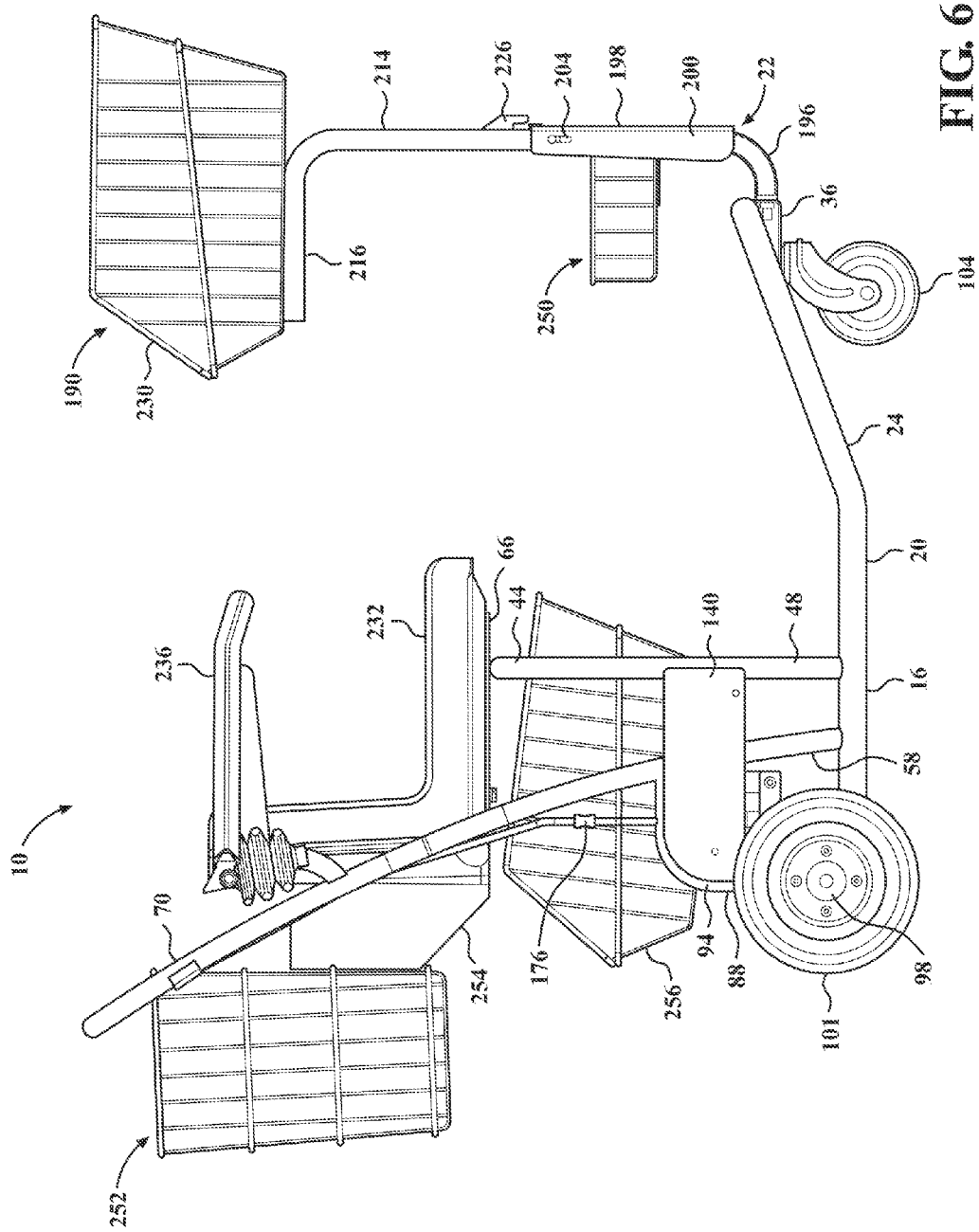
FIG. 6 is a side elevational view of the manual shopping cart with an added rear upper basket and a rear lower basket.

A lower basket assembly 250 may be mounted on the vertical transverse plate 198 if desired. This lower basket assembly 250 does not increase the nesting space needed for two or more manual shopping chairs 10. An additional basket assembly 252 may be supported to the rear of the seat 232 by a basket support 254. The basket support is attached to the seat mounting plate 66 and the transverse horizontal seat support pipe 64. The basket assembly 252 may interfere with the stored front basket assembly 190 as shown in FIG. 5. However, a modification of the basket assembly 252 would accommodate nesting of two shopping chairs 10. FIG. 6 also shows a forth basket assembly 256 that is mounted on the frame assembly 12 under the seat 232. The basket assembly 256 mounted under the seat 232 is the same size as the front basket assembly 228. A large basket assembly 256 mounted under the seat 232 will permit nesting of two manual shopping chairs 10 with the basket support bar 192 and attached left tube 194, right tube 196, vertical transverse plate 198, and connected structures removed from the frame assembly 12.

Figure 8:
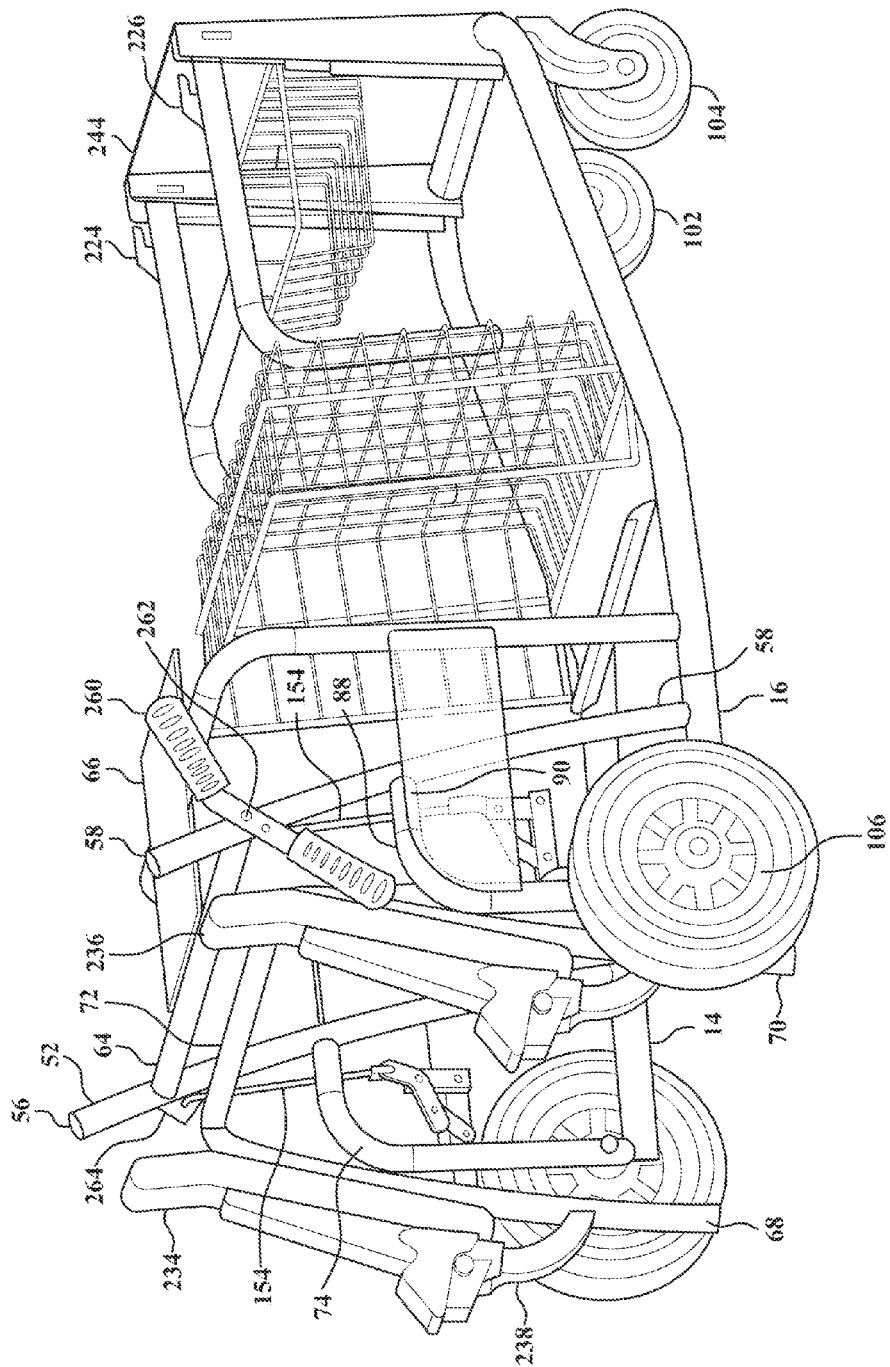
FIG. 8 is a perspective view of the manual shopping cart partially disassembled for shipping or long term storage.

A manual shopping chair 10 as shown in FIG. 8 is ready to be moved into a shipping container. The seat 232 is removed from the seat mounting plate 66. The left upper tube 68, the right upper tube 70 and the horizontal transverse handle 72 are removed from the left handle bar lower pipe 52 and the right handle bar lower pipe 58. The left upper tube 68 and the right upper tube 70 together with the arm rests 234 and 236 are temporally attached to left wheel support tube 74 and the right wheel support tube 88. The left rod connector 172 and the right rod connector 174 release the left generally vertical rod portion 178 and the right generally vertical rod portion 180. The horizontal release handle portion 176 and the integral left and right rod portions 178 and 180 remain secured to the left upper tube 68 and the right upper tube 70. A temporary handle 260, a torsion rod 262 and a lever arm 264 are attached to tension rods 154 and are manually operable to lift the lock bars 150 from the radially extending slots 120. Note that the torsion rod 262 is journaled in the seat support pipe 64. The wheel hubs 106 are unlocked and free to rotate when the lock bars 150 are moved from the slots 120 by the temporary handle 260.

Figure 9:
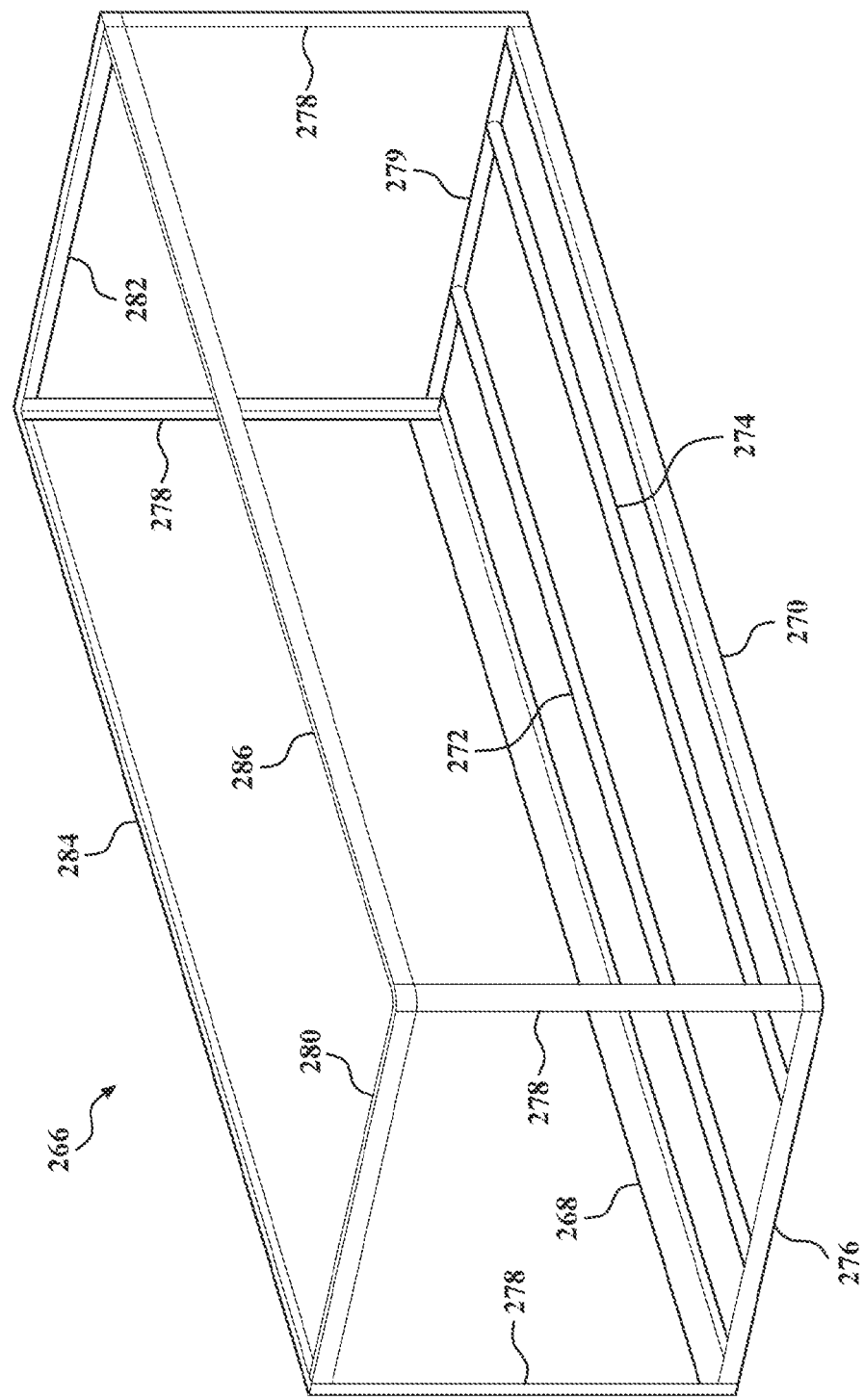
FIG. 9 is a perspective of an shipping and storage rack that holds at least three manual shopping cart.
Figure 10:
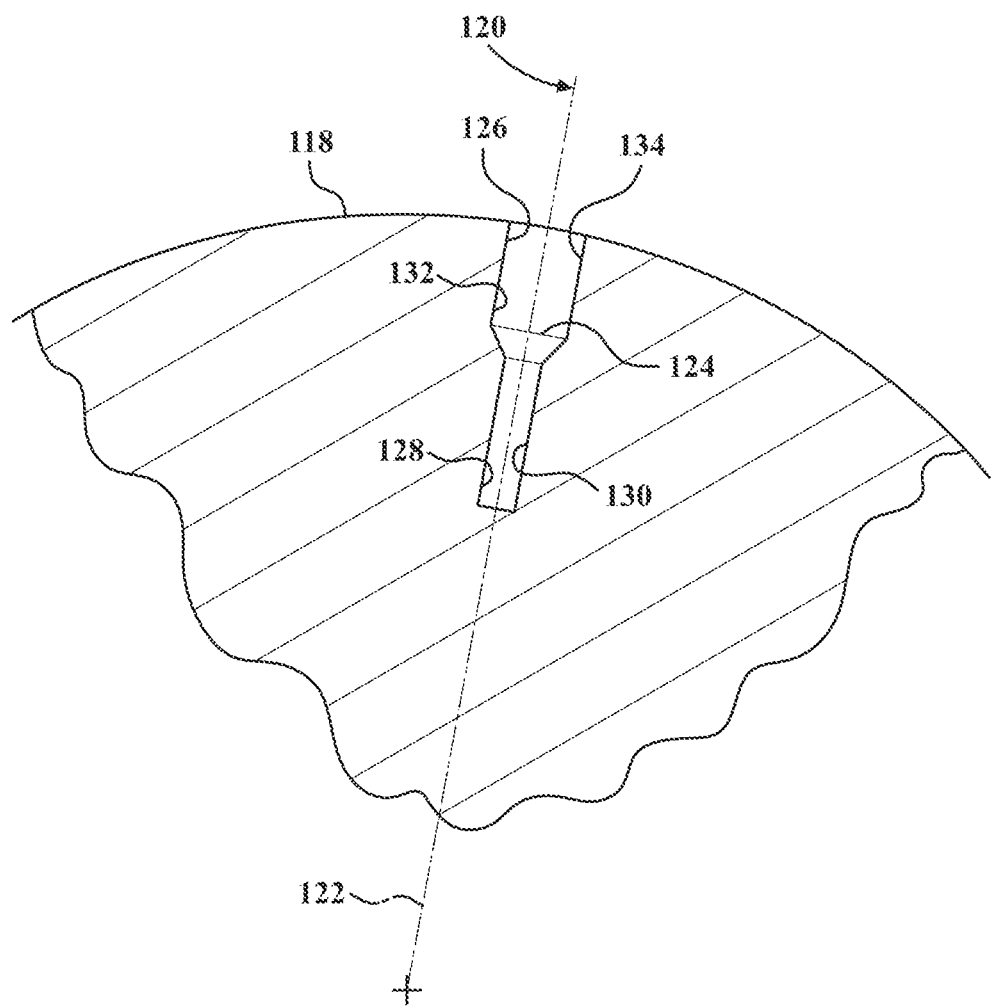
FIG. 10 is an enlarged side elevational view of one radially extend slot in a wheel locking disk with parts broken away.

The manual shopping cart 10 as shown in FIG. 8 is ready to be moved onto a shipping and storage rack 266 shown in FIG. 9. The shipping rack 266 has a base with elongated outer angle irons 268 and 270. The base also includes elongated inner angle irons 272 and 274. A first transverse angle irons 276 is attached to one end of the outer angle irons 268 and 270 and the inner angle irons and 274. A second transverse angle iron 279 is attached to the other ends of the outer angle irons 268 and 270 and the inner angle irons 272 and 274. Each of four vertical tubes 278 is attached to one of corners of the base. Short bars 280 and 282 are attached to the top vertical tubes on opposite ends of the base. Elongated bars 284 and 286 are attached to the tops of vertical tubes 284 and 286 on opposite sides of the base.

The rear wheel 87 and 101 of shopping carts 10 are supported on the outer angle irons 268 and 270. Caster wheels 102 and 104 are supported on inner angle irons 272 and 274. At least three manual shopping chairs 10 can be nested and protected on each shipping rack 266. Multiple shipping racks 266 may be stacked together in a vertical stack.

We claim:

1. A manual shopping chair comprising:
a frame assembly
a left rear wheel including a left wheel hub journaled on a left wheel spindle that is fixed to the frame assembly, and a tire mounted on the left wheel hub;
a right rear wheel including a right wheel hub journaled on a right wheel spindle that is fixed to the frame assembly, coaxial with the left wheel spindle and a tire mounted on the right wheel hub;
a left caster wheel and a right caster wheel spaced apart from each other and supporting a front horizontal transverse bar of the frame assembly;
a left wheel lock disk fixed to the left wheel hub and having a plurality of left radially extending slots each including a left lock disk radially extending slot center line extending radially from the left wheel spindle, a first left wheel lock disk slot wall parallel to the left lock disk radially extending slot center line, a second left wheel lock disk slot wall parallel to the first left wheel lock disk slot wall, a left wheel lock disk cylindrical radially outer surface and a left wheel lock disk radially outer slot open end extending from the first left wheel lock disk slot wall to the second left wheel lock disk slot wall;
a right wheel lock disk fixed to the right wheel hub and having a plurality of right radially extending slots each including a right lock disk radially extending slot center line extending radially from the right wheel spindle, a first right wheel lock disk slot wall parallel to the right lock disk radially extending slot center line, a second right wheel lock disk slot wall parallel to the first right wheel lock disk slot wall, a right wheel lock disk cylindrical radially outer surface and a right wheel lock disk radially outer slot open end extending from the first right wheel lock disk slot wall to the second right wheel lock disk slot wall;
a left lock arm pivotally attached to the frame assembly, a lock bar integral with the left lock arm and movable into and out of the plurality of radially extending slots of the left wheel lock disk, in response to pivotal movement of the left lock arm relative to the frame assembly;
a right lock arm pivotally attached to the frame assembly, a lock bar integral with the right lock arm and movable into an out of the plurality of radially extending slots of the right wheel lock disk, in response to pivotal movement of the right lock arm relative to the frame assembly;

a left spring urging the lock bar of the left lock arm toward the left wheel lock disk;

a right spring urging the lock bar of the right lock arm toward the right wheel lock disk;

a handle bar assembly integral with the frame assembly, a lock release adjacent the handle bar assembly and manually movable to pivot the left lock arm and the right lock arm and move the lock bar of the left lock arm and the lock bar of the right lock arm from engagement with the respective left wheel lock disk and the right wheel lock disk;

a front mast assembly clamped to the frame assembly, in combination with a basket assembly including a left outboard vertical plate, a left inboard vertical plate spaced from the left outboard vertical plate, a right outboard vertical plate, a right inboard vertical plate spaced from the right outboard vertical plate, a left transverse vertical plate portion fixed to a front surface of the left outboard vertical plate and the left inboard vertical plate, a right transverse vertical plate portion fixed to a front surface of the right outboard vertical plate and the right inboard vertical plate, a left vertical slot through the left outboard vertical plate and the left inboard vertical plate, a right vertical slot, and at least one shaft passing through the left vertical slot and the right vertical slot;

the basket assembly including a left basket support tube having a left pivoted tube portion and a left basket support tube portion, a free end of the left pivoted tube portion positioned between the left out board vertical plate and the left inboard vertical plate and retained by the at least one shaft, a right basket support tube having a right pivoted tube portion and a right basket support tube portion, a free end of the right pivoted tube portion positioned between the right outboard vertical plate and the right inboard vertical plate and retained by the at least one shaft, and the basket assembly connected to the left basket support tube portion and connected to the right basket support tube portion;

a left hook attached to the left pivoted tube portion and a right hook attached to the right pivoted tube portion and wherein the left hook engages the left transverse vertical plate portion and the right hook engages the right transverse vertical plate portion when the at least one shaft is in a bottom portion of the left vertical slot and a bottom portion of the right vertical slot and wherein the left basket support tube and the right basket support tube are free to pivot about the at least one shaft, between a basket upright position and a basket lowered position, when the at least one shaft is in an upper portion of the left vertical slot and an upper portion of the right vertical slot.

2. A manual shopping chair as set forth in claim 1, wherein the seat is above the left rear wheel and the right rear wheel.

3. A manual shopping chair, as set forth in claim 2 wherein the seat is supported by the frame assembly at an elevation that exceeds an elevation of a mast top edge.

4. A manual shopping chair, as set forth in claim 1 including a foot support plate mounted on the frame assembly and a foot support surface that extends rearwardly and downwardly from the front horizontal transverse bar of the frame assembly to a flange on a rear edge of the foot support plate.

5. A manual shopping chair, as set forth in claim 1, wherein the plurality of left radially extending slots in the left wheel lock disks includes up to twelve of the left radially extending slots; and the plurality of right radially extending slots in the right wheel lock disk includes up to twelve of the right radially extending slots.

6. A manual shopping chair as set forth in claim 1, wherein each of the plurality of left radially extending slots in the left wheel lock disk has a radially inner left slot portion with a pair of left radially inner slot walls that are parallel to the left lock disk radially extending slot center line, extend radially from the first left wheel lock disk slot wall and the second left wheel lock disk slot wall toward the left wheel spindle, and are closer to each other than the distance between the first left wheel lock disk slot wall and the second left wheel lock disk slot wall; and wherein each of the plurality of right radially extending slots in the right wheel lock disk has a radially inner right slot portion with a pair of right radially inner slot walls that are parallel to the right lock disk radially extending slot center line, extend radially from the first right wheel lock disk slot wall and the second right wheel lock disk slot wall toward the right wheel spindle and are closer to each other than the distance between the first right wheel lock disk slot wall and the second right wheel lock disk slot wall.

* * * * *